Oct. 11, 1927.

W. JERRAE

PNEUMATIC BUMPER

Filed Sept. 8, 1926

1,645,056

Inventor.
William Jerrae.

Patented Oct. 11, 1927.

UNITED STATES PATENT OFFICE.

WILLIAM JERRAE, OF SAN FRANCISCO, CALIFORNIA.

PNEUMATIC BUMPER.

Application filed September 8, 1926. Serial No. 134,225.

My invention relates to improvements in automobile bumpers and the objects of my improvements are to provide a bumper with an air cushion which will absorb the shock of ordinary collision without damage to either car, which will do away with the alarming noise of accidental contact, and which will be of an ornamental design.

I accomplish these objects by the means illustrated in the accompanying drawings in which—

Figure 1:
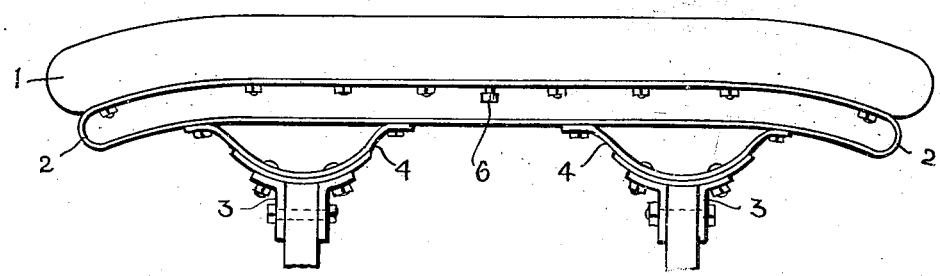
Figure 2:
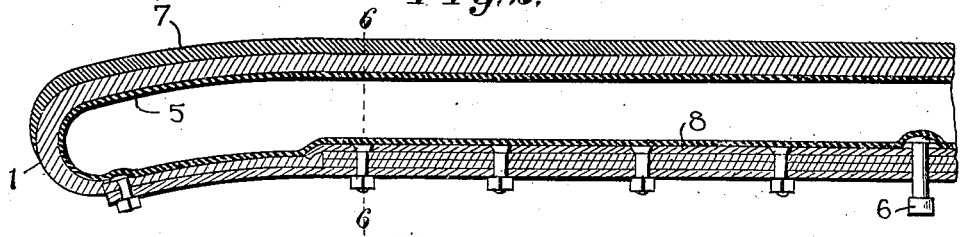
Figure 3:
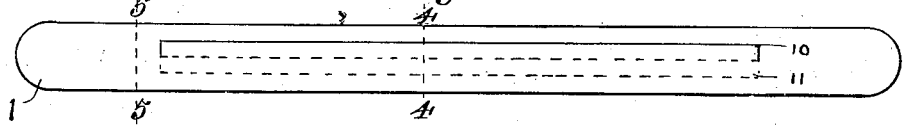
Figure 4:
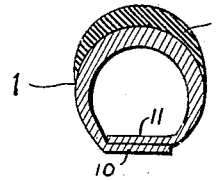
Figure 5:
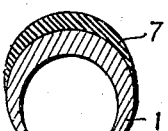
Figure 6:
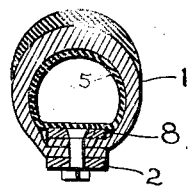
Figure 7:
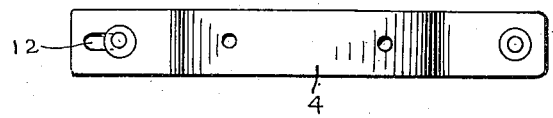

Figure 1 is a plan view of the bumper,
Figure 2 is a horizontal section,
Figure 3 is a rear elevation of the casing,
Figure 4 is a cross section on the line 4—4,
Figure 5 is a cross section on the line 5—5,
Figure 6 is a cross section on the line 6—6,
Figure 7 is a detail of the small leaf spring.

The pneumatic bumper consists of an inflated casing 1 of tire fabric and rubber bolted to a steel spring 2 which in turn is fastened to brackets 3 by means of short leaf springs 4. The brackets 3 may be of different sizes and shapes to fit different makes of car.

The bumper contains an inner tube 5 in the manner of an automobile tire, with a valve 6. A tread 7 protects the front of the casing 1, the edges of which casing are clamped between an inner steel strip 8 and the spring 2 by means of bolts 9, countersunk in the strip 8.

A slit is provided in the outer casing 1 for the insertion of the inner tube 5 and the steel strip 8. Overlapping flaps 10 and 11 close the opening.

The short leaf springs 4 are provided with slots 12 thru which they are bolted to the spring 2, the slots providing sliding contact for the ends of the short springs and enabling them to function as shock absorbers.

The pneumatic bumper is inflated to about twenty pounds pressure, and acting in conjunction with the springs serves almost completely to absorb the shock of collision. Instead of damaging, denting, or marring the object struck or brushed, the bumper conforms to its shape, and reduces the noise and violence of the shock to a minimum.

General harmony is secured by having the pneumatic bumper correspond in size to the tires of the car, but it is not desired to limit this specification to any particular size or design.

I claim:

1. A bumper having in combination a pneumatic cushion, comprising a rubber fabric casing for said cushion, a thickened rubber facing upon said casing, a slit in said casing, overlapping edges of said slit, an air tight rubber tube within said casing, a valve in said tube, a bumper spring to the rear of said pneumatic cushion, a steel strip on the rear inner wall of said casing; bolts clamping together said steel strip, said overlapping edges, and said bumper spring, small leaf springs attached rearwardly of said bumper spring, slots in said leaf springs, brackets supporting said leaf springs, and bolts passing thru said slots and attaching said leaf springs to said bumper spring.

2. An automobile bumper having in combination a pneumatic cushion, a spring bumper backing said cushion, small leaf springs backing said spring bumper, and brackets for attaching said leaf springs to an automobile.

3. A bumper having in combination a main spring, leaf springs behind said main spring, slots in said leaf springs, and bolting means for slidably attaching said slotted leaf springs to said main spring.

In testimony whereof I hereby affix my signature,

WILLIAM JERRAE.